(12) United States Patent
Hashimoto

(10) Patent No.: US 11,111,653 B2
(45) Date of Patent: Sep. 7, 2021

(54) CONTROL SYSTEM FOR WORK VEHICLE, METHOD FOR SETTING TRAJECTORY OF WORK IMPLEMENT, AND WORK VEHICLE

(71) Applicant: KOMATSU LTD., Tokyo (JP)

(72) Inventor: Kazuhiro Hashimoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/579,732

(22) PCT Filed: Mar. 31, 2017

(86) PCT No.: PCT/JP2017/013732
§ 371 (c)(1),
(2) Date: Dec. 5, 2017

(87) PCT Pub. No.: WO2018/179384
PCT Pub. Date: Oct. 4, 2018

(65) Prior Publication Data
US 2018/0355587 A1    Dec. 13, 2018

(51) Int. Cl.
*E02F 9/26* (2006.01)
*E02F 3/84* (2006.01)
(Continued)

(52) U.S. Cl.
CPC ............. *E02F 9/262* (2013.01); *B60W 30/10* (2013.01); *E02F 3/841* (2013.01); *E02F 3/844* (2013.01);
(Continued)

(58) Field of Classification Search
CPC ...... E02F 3/841; G05D 1/0212; G05D 1/0278
(Continued)

(56) References Cited

U.S. PATENT DOCUMENTS 8,639,393 B2    1/2014 Taylor et al.
8,954,255 B1 *  2/2015 Crawford ............ B60W 30/143
                                          701/93
(Continued)

FOREIGN PATENT DOCUMENTS

DE    102014210181 A1 *  3/2015
JP         9-128043 A      5/1997
(Continued)

OTHER PUBLICATIONS

The International Search Report for the corresponding international application No. PCT/JP2017/013732, dated Jun. 27, 2017.
(Continued)

*Primary Examiner* — Maceeh Anwari
(74) *Attorney, Agent, or Firm* — Global IP Counselors, LLP

(57) ABSTRACT

A control system for a work vehicle includes a controller. The controller acquires the travel direction of the work vehicle. The controller acquires current terrain data indicating a current terrain existing in the travel direction of the work vehicle. The controller decides a target profile of a work site based on the current terrain data. The controller generates a command signal to operate a work implement according to the target profile. The controller updates the travel direction of the work vehicle. The controller updates the target profile based on the updated travel direction.

18 Claims, 13 Drawing Sheets

(51) Int. Cl.
  G05D 1/02 (2020.01)
  B60W 30/10 (2006.01)
  E02F 9/20 (2006.01)
(52) U.S. Cl.
  CPC ......... *E02F 9/2045* (2013.01); *G05D 1/0212* (2013.01); *G05D 1/0274* (2013.01); *G05D 1/0278* (2013.01); *G05D 2201/0202* (2013.01)
(58) Field of Classification Search
  USPC .......................................................... 701/50
  See application file for complete search history.

(56) References Cited

U.S. PATENT DOCUMENTS

| | | | | |
|---|---|---|---|---|
| 9,469,969 | B2* | 10/2016 | Kanari | ..................... E02F 3/435 |
| 2003/0075970 | A1 | 4/2003 | Hainsworth et al. | |
| 2007/0044980 | A1 | 3/2007 | Stratton et al. | |
| 2016/0002882 | A1 | 1/2016 | Kanari et al. | |
| 2016/0123145 | A1 | 5/2016 | Westphalen et al. | |
| 2017/0220044 | A1 | 8/2017 | Sakai et al. | |
| 2019/0078292 | A1* | 3/2019 | Ono | ......................... G01C 3/08 |

FOREIGN PATENT DOCUMENTS

| | | | |
|---|---|---|---|
| JP | 2000-291076 A | | 10/2000 |
| JP | 2003-64725 A | | 3/2003 |
| JP | 2012-105557 A | | 6/2012 |
| JP | 2012105557 A | * | 6/2012 |
| WO | 2015/037642 A1 | | 3/2015 |
| WO | WO2015037642 A1 | * | 3/2015 |
| WO | WO201763823 A1 | * | 3/2016 |
| WO | 2016093374 A1 | | 6/2016 |
| WO | WO2016093374 A1 | * | 6/2016 |
| WO | 2017/163823 A1 | | 9/2017 |

OTHER PUBLICATIONS

Examination Report No. 1 for the corresponding Australian application No. 2017272179, dated Jun. 15, 2018.

The Office Action for the corresponding Canadian application No. 2,991,840, dated Oct. 26, 2018.

* cited by examiner

CONTROL SYSTEM FOR WORK VEHICLE, METHOD FOR SETTING TRAJECTORY OF WORK IMPLEMENT, AND WORK VEHICLE

CROSS-REFERENCE TO RELATED APPLICATIONS

This application is a U.S. National stage application of International Application No. PCT/JP2017/013732, filed on Mar. 31, 2017.

BACKGROUND

Field of the Invention

The present invention relates to a control system for a work vehicle, a method for setting the trajectory of a work implement, and a work vehicle.

Description of the Related Art

A system for a bulldozer, a grader, or another such work vehicle has been proposed in the past in which, in order to carry out work more efficiently, a target profile by which a work implement is to operate at the work site is preset from the terrain at the work site, and the work implement is operated according to this target profile.

SUMMARY

With the above-mentioned conventional system, even an inexperienced operator can perform work efficiently. With this conventional system, however, the work implement cannot necessarily be operated according to the target profile. For instance, the work vehicle may deviate from the intended path due to the properties of the soil, the gradient of the work site, and other such factors. In that case, work according to the target profile on route that differs from the planned route may not be efficient.

It is an object of the present invention to solve the above problem.

A first aspect is a control system for a work vehicle including a work implement. The control system includes a controller. The controller is programmed to execute the following processing. The controller acquires the travel direction of the work vehicle. The controller acquires current terrain data indicating the current terrain existing in the travel direction of the work vehicle. The controller decides on a target profile of a work site based on the current terrain data. The controller generates a command signal for operating the work implement according to the target profile. The controller updates the travel direction of the work vehicle. The controller updates the target profile based on the updated travel direction.

A second aspect is a method for setting the trajectory of a work implement of a work vehicle. The method includes the following processing. The first processing is to acquire the travel direction of the work vehicle. The second processing is to acquire current terrain data indicating the current terrain existing in the travel direction of the work vehicle. The third processing is to decide on a target profile of a work site based on the current terrain data. The fourth processing is to update the travel direction of the work vehicle. The fifth processing is to update the target profile based on the updated travel direction.

A third aspect is a work vehicle including a work implement and a controller. The controller is programmed to execute the following processing. The controller acquires the travel direction of the work vehicle. The controller acquires current terrain data indicating the current terrain existing in the travel direction of the work vehicle. The controller decides on a target profile of a work site based on the current terrain data. The controller generates a command signal for operating the work implement according to the target profile. The controller updates the travel direction of the work vehicle. The controller updates the target profile based on the updated travel direction.

With the present invention, a work vehicle can be made to perform work more efficiently and with good finish quality under automatic control.

DETAILED DESCRIPTION OF EMBODIMENT(S)

Figure 1:
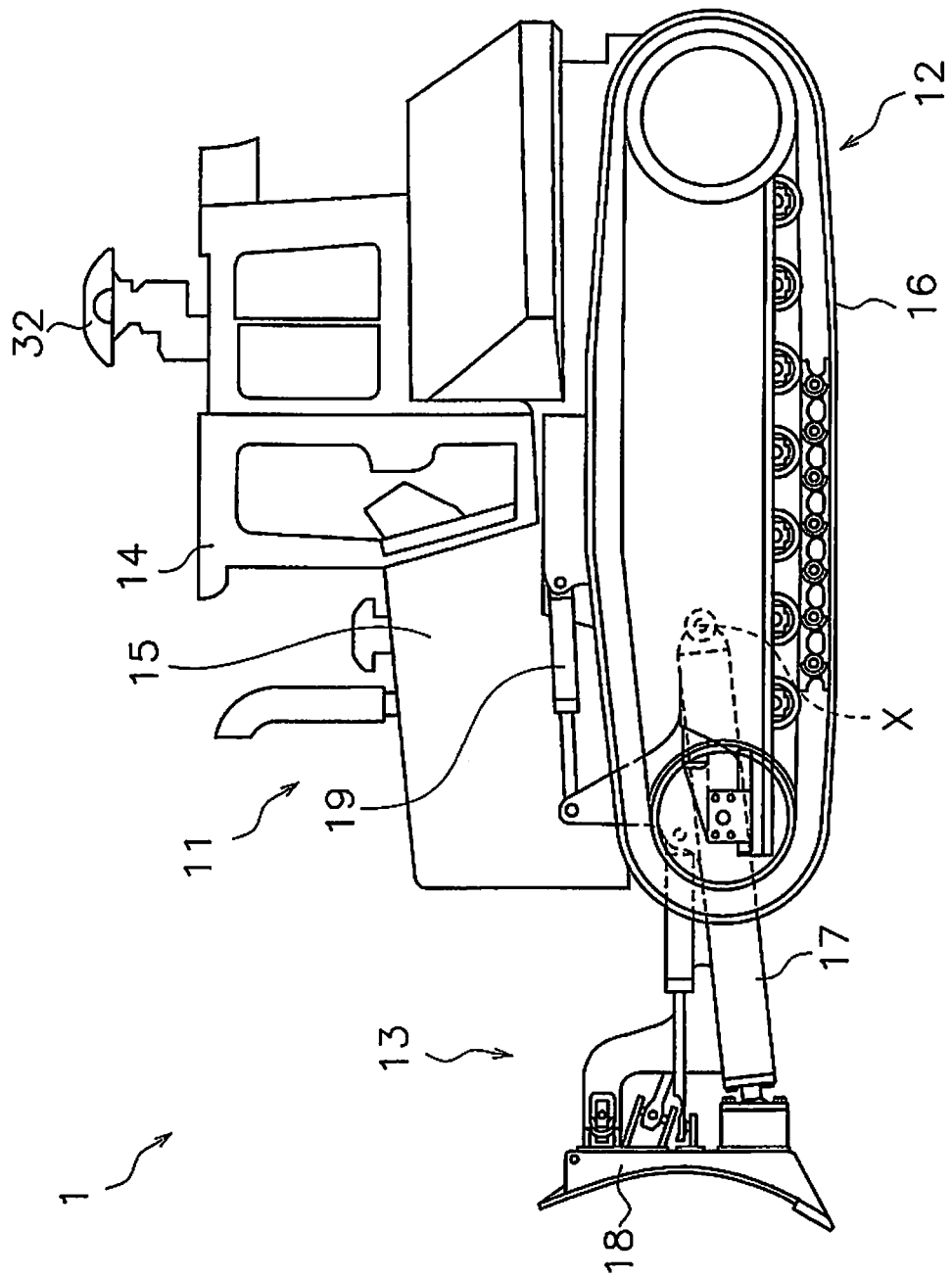
FIG. 1 is a side view of a work vehicle pertaining to an embodiment.

The work vehicle pertaining to an embodiment will now be described through reference to the drawings. FIG. 1 is a side view of the work vehicle 1 according to an embodiment. The work vehicle 1 in this embodiment is a bulldozer. The work vehicle 1 includes a vehicle body 11, a drive unit 12, and a work implement 13.

The vehicle body 11 has a cab 14 and an engine compartment 15. A driver's seat (not shown) is disposed in the cab 14. The engine compartment 15 is disposed in front of the cab 14. The drive unit 12 is attached to the lower portion of the vehicle body 11. The drive unit 12 has a pair of right and left crawler belts 16. Only the left crawler belt 16 is shown in FIG. 1. Rotation of the crawler belts 16 propels the work vehicle 1. The travel of the work vehicle 1 may be either autonomous travel, semi-autonomous travel, or travel under operation by the operator.

The work implement 13 is attached to the vehicle body 11. The work implement 13 has a lift frame 17, a blade 18, and a lift cylinder 19.

The lift frame 17 is attached to the vehicle body 11 so as to be movable up and down around an axis X extending in the vehicle width direction. The lift frame 17 supports the blade 18. The blade 18 is disposed in front of the vehicle body 11. The blade 18 moves up and down as the lift frame 17 moves up and down.

The lift cylinder 19 is linked to the vehicle body 11 and the lift frame 17. As the lift cylinder 19 expands and contracts, the lift frame 17 rotates up and down around the axis X.

Figure 2:
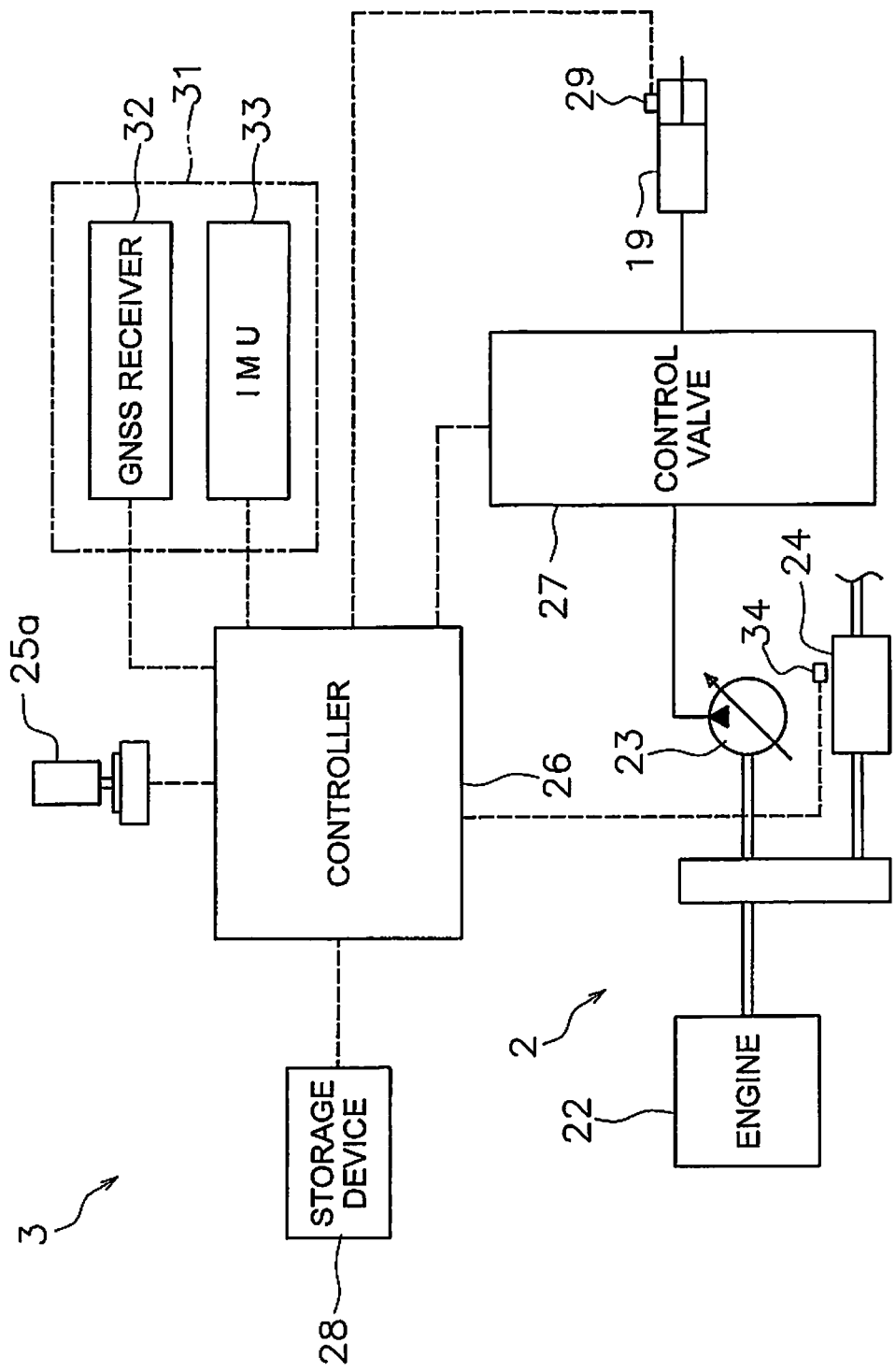
FIG. 2 is a block diagram of the configuration of the drive system and control system of the work vehicle.

FIG. 2 is a block diagram of the configuration of the drive system 2 and the control system 3 of the work vehicle 1. As shown in FIG. 2, the drive system 2 includes an engine 22, a hydraulic pump 23, and a power transmission device 24.

The hydraulic pump 23 is driven by the engine 22 and discharges hydraulic fluid. The hydraulic fluid discharged from the hydraulic pump 23 is supplied to the lift cylinder 19. In FIG. 2, just one hydraulic pump 23 is shown, but a plurality of hydraulic pumps may be provided.

The power transmission device 24 transmits the drive force of the engine 22 to the drive unit 12. The power transmission device 24 may be, for example, a hydro-static transmission (HST). Alternatively, the power transmission device 24 may be, for example, a torque converter or a transmission having a plurality of gears.

The control system 3 includes an operating device 25a, a controller 26, a storage device 28, and a control valve 27. The operating device 25a is used to operate the work implement 13 and the drive unit 12. The operating device 25a is disposed in the cab 14. The operating device 25a receives operator inputs for driving the work implement 13 and the drive unit 12, and outputs an operation signal corresponding to the input. The operating device 25a includes, for example, a control lever, a pedal, a switch, or the like.

For example, the operating device 25a for the drive unit 12 is provided to allow for operation in a forward position, a reverse position, and a neutral position. An operation signal indicating the position of the operating device 25a is outputted to the controller 26. When the operation position of the operating device 25a is the forward position, the controller 26 controls the drive unit 12 or the power transmission device 24 so that the work vehicle 1 moves forward. When the operating position of the operating device 25a is the reverse position, the controller 26 controls the drive unit 12 or the power transmission device 24 so that the work vehicle 1 moves backward.

The controller 26 is programmed to control the work vehicle 1 on the basis of acquired data. The controller 26 includes a processing device (processor) such as a CPU, for example. The controller 26 acquires an operation signal from the operating device 25a. The controller 26 controls the control valve 27 on the basis of the operation signal. The controller 26 is not limited to a single unit, and may be divided up into a plurality of controllers.

The control valve 27 is a proportional control valve and is controlled by a command signal from the controller 26. The control valve 27 is disposed between the hydraulic pump 23 and a hydraulic actuator such as the lift cylinder 19. The control valve 27 controls the flow of hydraulic fluid supplied from the hydraulic pump 23 to the lift cylinder 19. The controller 26 generates a command signal to the control valve 27 so that the blade 18 operates according to the operation of the operating device 25a discussed above. Consequently, the lift cylinder 19 is controlled according to the operation amount of the operating device 25a. The control valve 27 may be a pressure proportional control valve. Alternatively, the control valve 27 may be an electromagnetic proportional control valve.

Figure 3:
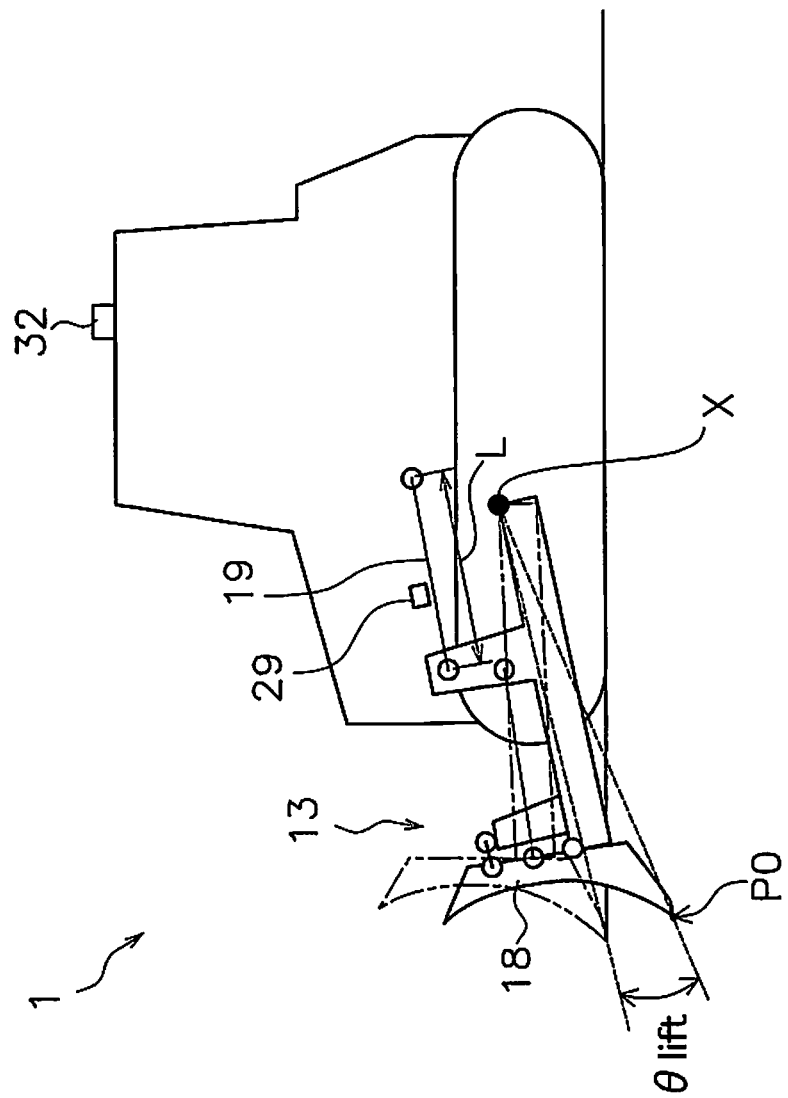
FIG. 3 is a simplified diagram of the configuration of the work vehicle.

The control system 3 includes a lift cylinder sensor 29. The lift cylinder sensor 29 senses the stroke length of the lift cylinder 19 (hereinafter referred to as "lift cylinder length L"). As shown in FIG. 3, the controller 26 calculates the lift angle θlift of the blade 18 on the basis of the lift cylinder length L. FIG. 3 is a simplified diagram of the configuration of the work vehicle 1.

In FIG. 3, the origin position of the work implement 13 is indicated by a two-dot chain line. The origin position of the work implement 13 is the position of the blade 18 in a state in which the cutting edge of the blade 18 is in contact with the ground on a horizontal surface. The lift angle θlift is the angle of the work implement 13 from the origin position.

As shown in FIG. 2, the control system 3 includes a position sensing device 31. The position sensing device 31 measures the position of the work vehicle 1. The position sensing device 31 includes a GNSS (global navigation satellite system) receiver 32 and an IMU 33. The GNSS receiver 32 is, for example, a GPS (global positioning system) receiver. The antenna of the GNSS receiver 32 is disposed on the cab 14. The GNSS receiver 32 receives positioning signals from a satellite and calculates the position of the antenna based on the positioning signal to generate vehicle position data. The controller 26 acquires vehicle position data from the GNSS receiver 32. The controller 26 obtains the travel direction and speed of the work vehicle 1 by using the vehicle position data.

The IMU 33 is an inertial measurement unit. The IMU 33 acquires vehicle inclination angle data. The vehicle inclination angle data includes the angle of the vehicle longitudinal direction with respect to the horizontal (pitch angle), and the angle of the vehicle lateral direction with respect to the horizontal (roll angle). The controller 26 acquires vehicle inclination angle data from the IMU 33.

The controller 26 calculates a cutting edge position P0 from the lift cylinder length L, the vehicle position data, and the vehicle inclination angle data. As shown in FIG. 3, the controller 26 calculates the global coordinates of the GNSS receiver 32 based on the vehicle position data. The controller 26 calculates the lift angle θlift based on the lift cylinder length L. The controller 26 calculates the local coordinates of the cutting edge position P0 with respect to the GNSS receiver 32 based on the lift angle θlift and vehicle size data. The vehicle size data is stored in the storage device 28 and indicates the position of the work implement 13 with respect to the GNSS receiver 32. The controller 26 calculates the global coordinates of the cutting edge position P0 based on the global coordinates of the GNSS receiver 32, the local coordinates of the cutting edge position P0, and the vehicle inclination angle data. The controller 26 acquires the global coordinates of the cutting edge position P0 as cutting edge position data.

The storage device 28 includes, for example, a memory and an auxiliary storage device. The storage device 28 may be, for example, a RAM, a ROM, or the like. The storage device 28 may be a semiconductor memory, a hard disk, or the like. The storage device 28 is an example of a non-transitory computer-readable recording medium. The storage device 28 records computer commands which is executable by a processor for controlling the work vehicle 1.

The storage device 28 stores design terrain data and work site terrain data. The design terrain data indicates the final design terrain. The final design terrain is the final target contour of the surface of the work site. The design terrain data is, for example, an earthmoving execution plan in a three-dimensional data format. The work site terrain data indicates the current terrain at the work site. The work site terrain data is, for example, a current topographical survey in a three-dimensional data format. The work site terrain data can be obtained by aerial laser survey, for example.

The controller 26 acquires the current terrain data. The current terrain data indicates the to current terrain at the work site. The current terrain at the work site is the terrain of the region along the travel direction of the work vehicle 1. The current terrain data is acquired by calculation in the controller 26 from the work site terrain data and the position and travel direction of the work vehicle 1 obtained from the above-mentioned position sensing device 31.

The controller 26 automatically controls the work implement 13 on the basis of the current terrain data, the design terrain data, and the cutting edge position data. The automatic control of the work implement 13 may be semi-automatic control performed together with manual operation by the operator. Alternatively, the automatic control of the work implement 13 may be fully automatic control performed without any manual operation by an operator.

Figure 4:
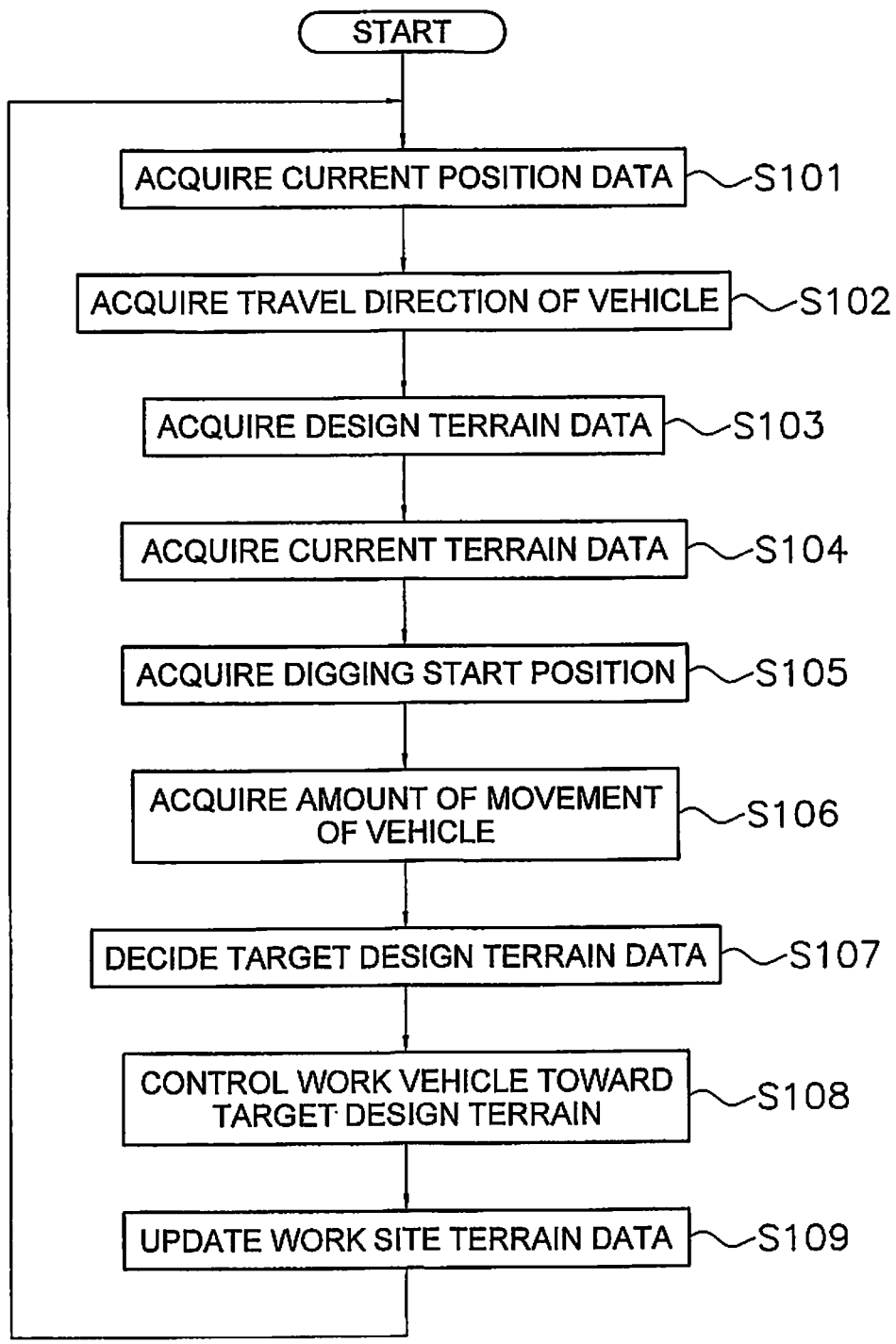
FIG. 4 is a flowchart of processing in the automatic control of a work implement.

The automatic control of the work implement 13 in digging work executed by the controller 26 will now be described. FIG. 4 is a flowchart of the processing involved in automatic control of the work implement 13 in digging work.

As shown in FIG. 4, in step S101 the controller 26 acquires current position data. Here, the controller 26 acquires the current cutting edge position P0 of the blade 18 as discussed above.

In step S102, the controller 26 acquires the travel direction of the work vehicle 1. Here, as discussed above, the controller 26 acquires the travel direction of the work vehicle 1 from the vehicle position data sensed by the position sensing device 31.

Figure 5:
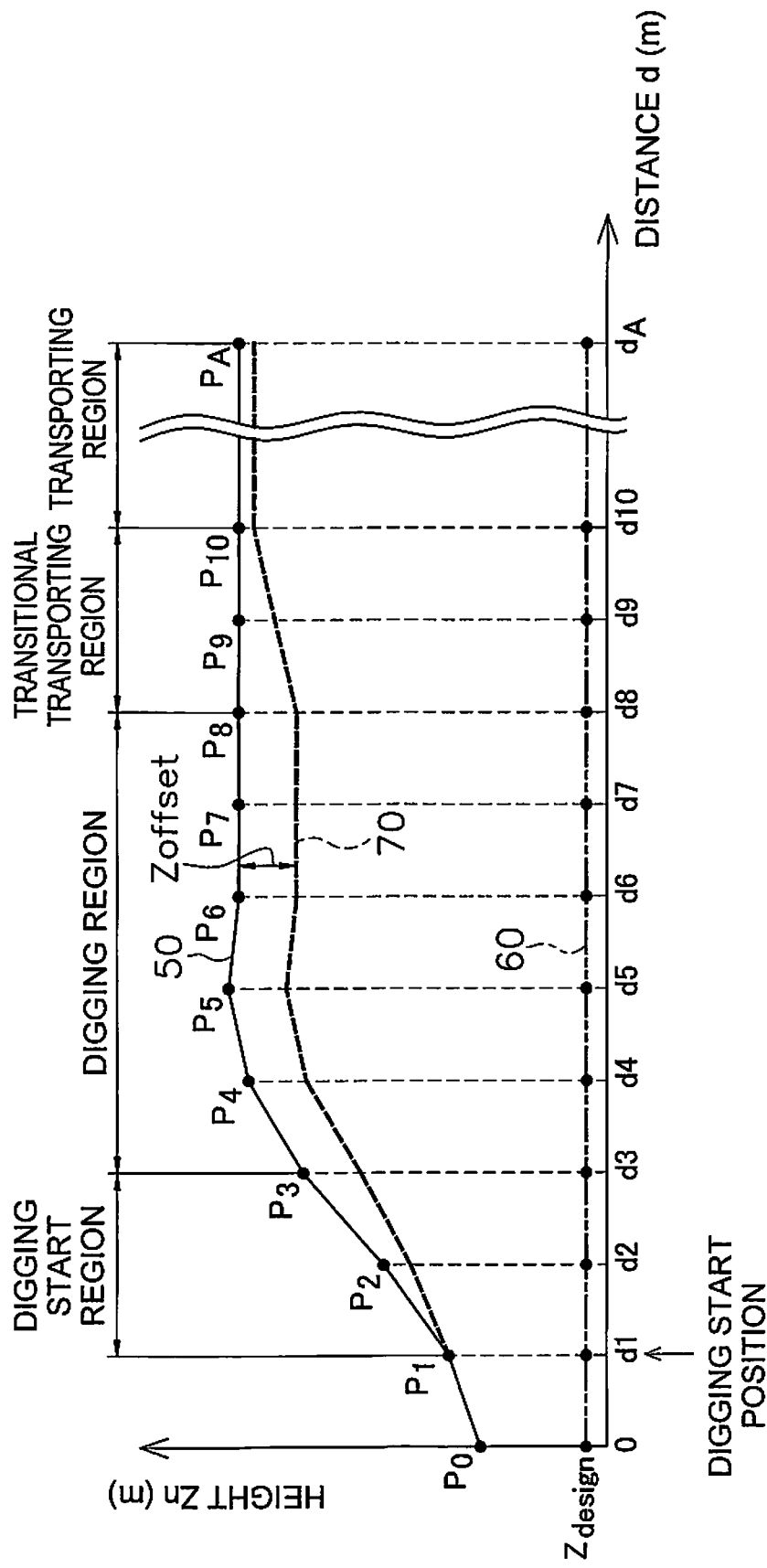
FIG. 5 is a graph showing an example of a final design terrain, a current terrain, and a target design terrain.

In step S103, the controller 26 acquires the current terrain data. As shown in FIG. 5, the design terrain data includes the height Zdesign of the final design terrain 60 at a plurality of reference points Pn (n=0, 1, 2, 3, . . . , A) in the travel direction of the work vehicle 1. The plurality of reference points Pn indicate a plurality of points at predetermined intervals along the travel direction of the work vehicle 1. The plurality of reference points Pn lie on the travel path of the blade 18. In FIG. 5, the final design terrain 60 has a flat contour parallel to the horizontal direction, but it may have a different contour.

In step S104, the controller 26 acquires the current terrain data. The controller 26 acquires the current terrain data by calculation from the work site terrain data obtained from the storage device 28, and the vehicle position data and the travel direction data obtained from the position sensing device 31.

The current terrain data is information indicating the terrain located in the travel direction of the work vehicle 1. FIG. 5 is a cross section of the current terrain 50. In FIG. 5, the vertical axis is the height of the terrain, and the horizontal axis is the distance from the current position in the travel direction of the work vehicle 1.

More precisely, the current terrain data includes the height Zn of the current terrain 50 at a plurality of reference points Pn up to a specific terrain recognition distance dA from the current position in the travel direction of the work vehicle 1. In this embodiment, the current position is a position determined on the basis of the current cutting edge position P0 of the work vehicle 1. However, the current position may be determined on the basis of the current position of another part of the work vehicle 1. The plurality of reference points are arranged at specific intervals, such as every meter.

Figure 6:
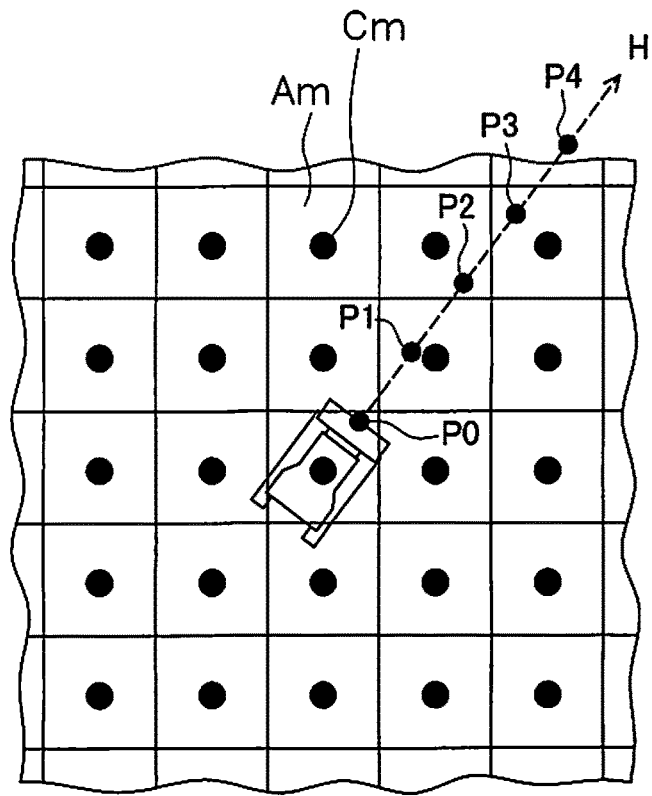
FIG. 6 is a diagram showing an example of work site terrain data.

FIG. 6 is a diagram showing an example of work site terrain data. The work site terrain data divides the current terrain of the work site into a plurality of areas Am in a grid in a horizontal plane, and indicates the height of the current terrain in each area Am. The size of each square of the grid, that is, the size of each area Am, is 1 m×1 m, for example, but is not limited to this size, and may be a different one. The work site terrain data indicates the planar coordinates of the northerly distance (northing) and the easterly distance (easting) of the center point Cm of each area Am, and the height of the current terrain at that center point Cm. In FIG. 6, only some of the areas are labeled "Am," and only their center points are labeled "Cm," and the rest of the areas are not labeled.

As shown in FIG. 6, the controller 26 decides a plurality of reference points Pn located within a specific distance dA from the cutting edge position P0 along the travel direction H of the work vehicle 1. The controller 26 then calculates the height Zn of the current terrain 50 at each reference point Pn from the height of the current terrain in the area Am surrounding each reference point Pn.

For example, the controller 26 calculates the height Zn of the current terrain 50 at each reference point Pn by linear interpolation from the height of the current terrain in the four areas Am surrounding each reference point Pn. However, the height Zn of the current landform 50 may be acquired by a method other than linear interpolation. Consequently, as shown in FIG. 5, the controller 26 acquires the height Zn of the current terrain 50 at the plurality of reference points Pn along the travel direction of the work vehicle 1 as the current terrain data.

In step S105 the controller 26 acquires the digging start position. For example, the to controller 26 acquires the position as the digging start position when the cutting edge position P0 first drops below the height Z0 of the current terrain 50. Consequently, the position is acquired as the digging start position, where the cutting edge of the blade 18 is lowered and digging of the current terrain 50 is started. However, the controller 26 may acquire the digging start position by some other method. For example, the controller 26 may acquire the digging start position on the basis of the operation of the operating device 25a. For instance, the controller 26 may acquire the digging start position on the basis of the operation of a button, a screen operation with a touch panel, etc.

In step S106 the controller 26 acquires the amount of movement of the work vehicle 1. The controller 26 acquires the distance traveled from the digging start position to the current position in the travel path of the blade 18 as the amount of movement. The amount of movement of the work vehicle 1 may be the amount of movement of the vehicle body 11. Alternatively, the amount of movement of the work vehicle 1 may be the amount of movement of the cutting edge of the blade 18.

In step S107 the controller 26 decides the target design terrain data. The target design terrain data shows the target design terrain 70 indicated by a broken line in FIG. 5. The target design terrain 70 indicates the desired trajectory of the cutting edge of the blade 18 in operation. The target design terrain 70 is the target profile of the terrain to be worked, and shows the contour desired as the result of the digging work.

As shown in FIG. 5, the controller 26 decides the target design terrain 70 that is displaced downward from the current terrain 50 by the target displacement Z_offset. The target displacement Z_offset is the target displacement in the vertical direction at each reference point. In this embodiment, the target displacement Z_offset is the target depth at each reference point, and indicates the target position of the blade 18 below the current terrain 50. The target position of the blade 18 means the cutting edge position of the blade 18. In other words, the target displacement Z_offset indicates the soil volume per unit of movement dug by the blade 18. Therefore, the target design terrain data indicates the relation between a plurality of reference points and a plurality of target soil volumes. The target displacement Z_offset is an example of a target load parameter related to the load on the blade 18.

The controller 26 decides the target design terrain 70 so as not to go below the final design terrain 60. Therefore, the controller 26 decides the target design terrain 70 located at or above the final design terrain 60 and below the current terrain 50 during digging work.

More precisely, the controller 26 decides the height Z of the target design terrain 70 according to the following formula (1).

$$Z = Zn - Z\_offset \qquad \text{Formula 1}$$

Figure 7:
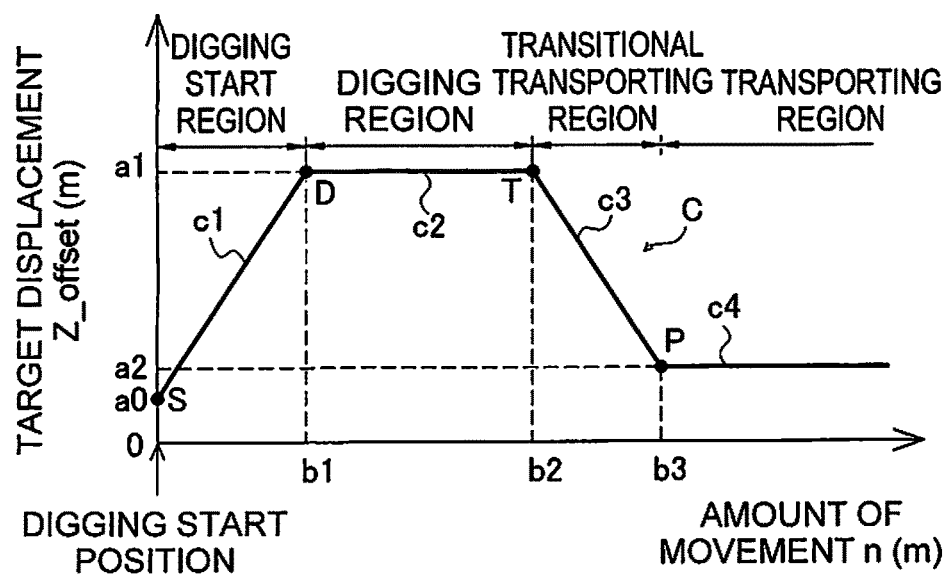
FIG. 7 is a graph showing an example of target displacement data.

The target displacement Z_offset is decided by referring to the target displacement data C. The target displacement data C is stored in the storage device 28. FIG. 7 is a diagram showing an example of the target displacement data C. The target displacement data C defines the relation between the amount of movement n of the work vehicle 1 and the target displacement Z_offset.

More precisely, the target displacement data C indicates the digging depth (target displacement) Z_offset of the blade 18 in the vertical downward direction from the ground surface as a dependent variable of the amount of movement n of the work vehicle 1 in the horizontal direction. The amount of movement n of the work vehicle 1 in the horizontal direction is substantially the same as the amount of movement of the blade 18 in the horizontal direction. The controller 26 decides the target displacement Z_offset from the amount of movement n of the work vehicle 1 by referring to the target displacement data C shown in FIG. 7.

As shown in FIG. 7, the target displacement data C includes data at start c1, data during digging c2, data during transition c3, and data during transporting c4. The data at start c1 defines the relation between the amount of movement n in the digging start region and the target displacement Z_offset. The digging start region is the region from the digging starting point S to the steady digging starting point D. As indicated by the data at start c1, the target displacement Z_offset that gradually increases according to the increase in the amount of movement n is defined in the digging start region. The data at start c1 defines the target displacement Z_offset that linearly increases with respect to the amount of movement n.

The data during digging c2 defines the relation between the amount of movement n in the digging region and the target displacement Z_offset. The digging region is the region (first region) from the steady digging starting point D to the transitional transporting starting point T. As indicated by the data during digging c2, in the digging region, the target displacement Z_offset is defined as a constant value. The data during digging c2 defines a constant target displacement Z_offset with respect to the amount of movement n.

The data during transition c3 defines the relation between the amount of movement n and the target displacement Z_offset in the transitional transporting region. The transitional transporting region is the region from the steady digging end point T to the transporting starting point P. As indicated by the data during transition c3, the target displacement Z_offset that gradually decreases according to the increase in the amount of movement n is defined in the transitional transporting region. The data during transition c3 defines the target displacement Z_offset that linearly decreases with respect to the amount of movement n.

The data during transporting c4 defines the relation between the amount of movement n in the transporting region and the target displacement Z_offset. The transporting region is the region (second region) starting from the transporting starting point P. As indicated by the data during transporting c4, the target displacement Z_offset is defined as a constant value in the transporting region. The data during transporting c4 defines a constant target displacement Z_offset with respect to the amount of movement n.

More precisely, the digging region starts at a first start value b1 and ends at a first end value b2. The transporting region starts at a second start value b3. The first end value b2 is less than the second start value b3. Therefore, the digging region is started when the amount of movement n is less than that in the transporting region. The target displacement Z_offset in the digging region is constant at a first target value a1. The target displacement Z_offset in the transporting region is constant at a second target value a2. The first target value a1 is greater than the second target value a2. Therefore, in the digging region, the target displacement Z_offset is defined to be greater than in the transporting region.

The target displacement Z_offset at the digging start position is a start value a0. The start value a0 is less than the first target value a1. The start target value a0 is also less than the second target value a2.

Figure 8:
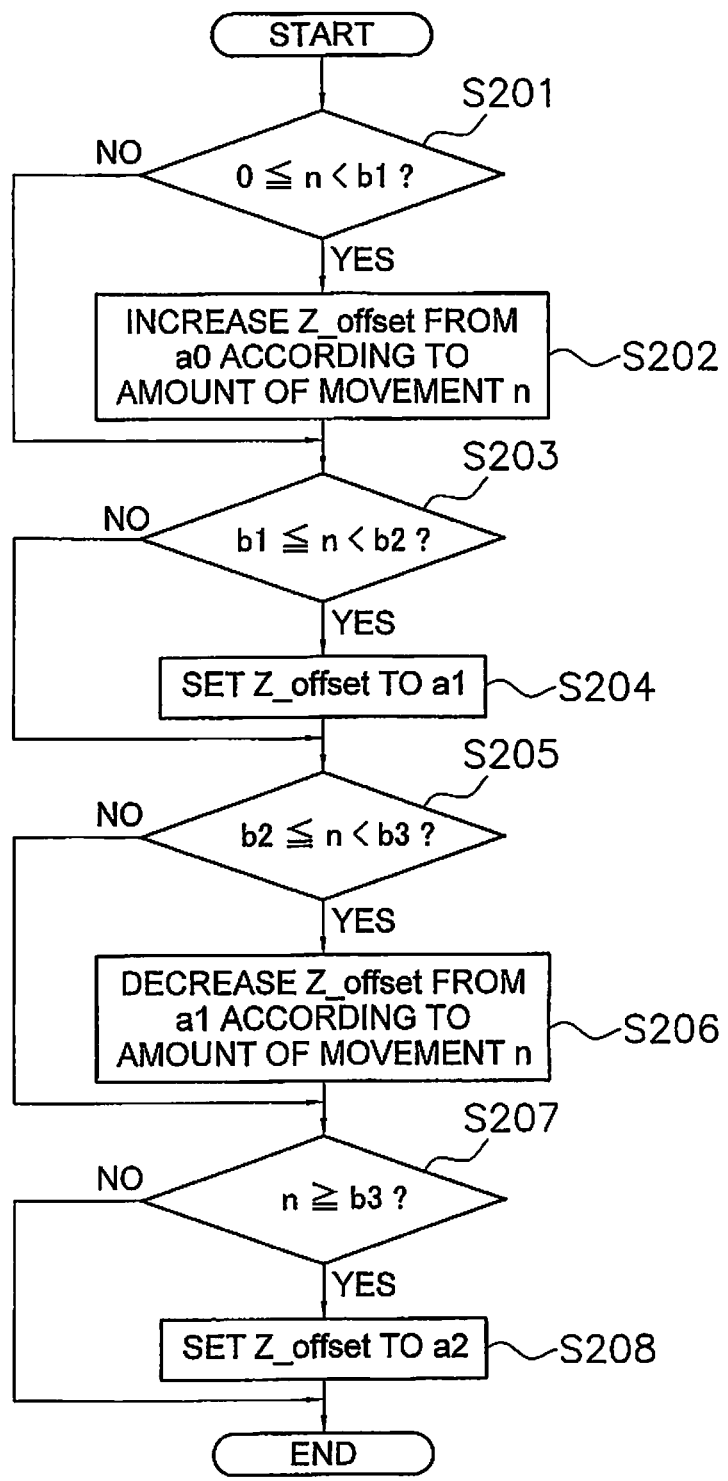
FIG. 8 is a flowchart of the processing for deciding a target displacement.

FIG. 8 is a flowchart showing the processing for deciding the target displacement Z_offset. In order to simplify the description, let us assume that in the decision processing described below, the travel of the work vehicle 1 is only forward. The decision processing is started when the operating device 25*a* moves to the forward position. In step S201, the controller 26 determines whether the amount of movement n is equal to or greater than 0 and less than the first start value b1. When the amount of movement n is equal to or greater than 0 and less than the first start value b1, in step S202 the controller 26 gradually increases the target displacement Z_offset from the start value a0 according to the increase in the amount of movement n.

The start value a0 is a constant and is stored in the storage device 28. It is preferable for the start value a0 to be small enough that the load on the blade 18 at the start of digging will not be excessively high. The first start value b1 is found by calculation from the gradient c1 in the digging start region shown in FIG. 7, the start value a0, and the first target value a1. The gradient c1 is a constant and is stored in the storage device 28. It is preferable for the gradient c1 to be a value at which it is possible to transition quickly from the digging start to the digging work, and the load on the blade 18 will not be excessively high.

In step S203 the controller 26 determines whether the amount of movement n is equal to or greater than the first start value b1 and less than the first end value b2. When the amount of movement n is equal to or greater than the first start value b1 and less than the first end value b2, in step 5204 the controller 26 sets the target displacement Z_offset to the first target value a1. The first target value a1 is a constant and is stored in the storage device 28. It is preferable for the first target value a1 to be a value at which digging can be performed efficiently and the load on the blade 18 will not be excessively high.

In step S205 the controller 26 determines whether the amount of movement n is equal to or greater than the first end value b2 and less than the second start value b3. When the amount of movement n is equal to or greater than the first end value b2 and less than the second start value b3, in step S206 the controller 26 gradually decreases the target displacement Z_offset from the first target value a1 according to the increase in the amount of movement n.

The first end value b2 is the amount of movement when the current held soil volume of the blade 18 is over a specific threshold. Therefore, when the current held soil volume of the blade 18 goes over a specific threshold, the controller 26 decreases the target displacement Z_offset from the first target value a1. This specific threshold is decided on the basis of the maximum capacity of the blade 18, for example. For instance, the current held soil volume of the blade 18 may be decided by measuring the load on the blade 18 and calculating from this load. Alternatively, the current held soil volume of the blade 18 may be calculated by using a camera to capture an image of the blade 18 and analyzing this image.

At the start of work, a specific initial value is set as the first end value b2. After the start of work, the amount of movement when the held soil volume of the blade 18 goes over a specific threshold is stored as an update value, and the first end value b2 is updated on the basis of the stored update value.

In step 5207 the controller 26 determines whether the amount of movement n is equal to or greater than the second start value b3. When the amount of movement n is equal to or greater than the second start value b3, in step S208 the controller 26 sets the target displacement Z_offset to the second target value a2.

The second target value a2 is a constant and is stored in the storage device 28. The second target value a2 is preferably set to a value suitable for transporting work. The second start value b3 is found by calculation from the gradient c2 in the transporting transfer region shown in FIG. 7, the first target value a1, and the second target value a2. The gradient c2 is a constant and is stored in the storage device 28. It is preferable for the gradient c2 to be a value at which it is possible to transition quickly from digging work to transporting work, and the load on the blade 18 will not be excessively high.

The start value a0, the first target value a1, and the second target value a2 may be changed according to the situation of the work vehicle 1, etc. The first start value b1, the first end value b2, and the second start value b3 may be stored in the storage device 28 as constants.

As described above, the height Z of the target design terrain 70 is decided by deciding the target displacement Z_offset.

In step S108 shown in FIG. 4, the controller 26 controls the blade 18 toward the target design terrain 70. Here, the controller 26 generates a command signal to the work implement 13 so that the cutting edge position of the blade 18 moves toward the target design terrain 70 produced in step S107. The generated command signal is inputted to the control valve 27. Consequently, the cutting edge position P0 of the work implement 13 moves along the target design terrain 70.

In the above-mentioned digging region, the target displacement Z_offset between the current terrain 50 and the target design terrain 70 is greater than in other regions. Consequently, in the digging region, digging work is performed on the current terrain 50. In the transporting region, the target displacement Z_offset between the current terrain 50 and the target design terrain 70 is less than in other regions. Consequently, in the transporting region, digging of the ground surface is held off, and soil held in the blade 18 is conveyed.

In step S109 the controller 26 updates the work site terrain data. The controller 26 updates the work site terrain data with position data indicating the latest trajectory of the cutting edge position P0. Alternatively, the controller 26 may calculate the position of the bottom face of the crawler belt 16 from the vehicle position data and the vehicle size data, and update the work site terrain data with position data indicating the trajectory of the bottom face of the crawler belt 16. In this case, the update of the work terrain data can be carried out instantly.

Alternatively, the work site terrain data may be generated from survey data measured by a surveying device outside the work vehicle 1. Aerial laser surveying may be used as an external surveying device, for example. Alternatively, the current terrain 50 may be photographed with a camera, and work site terrain data may be generated from the image data obtained by the camera. For example, aerial photographic surveying using a UAV (unmanned aerial vehicle) may be used. In the case of an external surveying device or a camera, the work site terrain data is updated at specific intervals, or whenever needed.

The above processing is executed when the work vehicle 1 is moving forward. For example, the above processing is executed when the operating device 25a of the drive unit 12 is in the forward position. However, if the work vehicle 1 travels in reverse by at least a specific distance, the digging start position and the amount of movement n are initialized. The held soil volume of the blade 18 is also initialized.

The above processing is executed when the work vehicle 1 moves forward again. The controller 26 updates the current terrain 50 based on the updated work site terrain data, and decides the new target design terrain 70 on the basis of the updated current terrain 50. The controller 26 then controls the blade 18 along the newly decided target design terrain 70. This processing is repeated to perform digging so that the current terrain 50 approaches the final design terrain 60.

The controller 26 in the above embodiment repeats the processing of steps S101 to S109 every time the work vehicle moves forward a specific distance, or at specific time intervals during forward movement. However, the controller 26 may repeat the processing of steps S101 to S109 every time the work vehicle moves backward a specific distance, or at specific time intervals during backward movement. In this case, when the work vehicle 1 moves forward by equal to or greater than a specific distance, the digging start position and the amount of movement n may be initialized. The controller 26 may repeat the processing of steps S101 to S109 every time the work vehicle moves a specific distance, or at specific time intervals. In step S101 the controller 26 newly acquires and updates the current position data. Also, in step S102 the controller 26 newly acquires and updates the travel direction of the work vehicle 1. Therefore, when the travel direction of the work vehicle 1 is changed, the controller 26 acquires the changed travel direction, and updates the target design terrain 70 on the basis of the changed travel direction.

Figure 9:
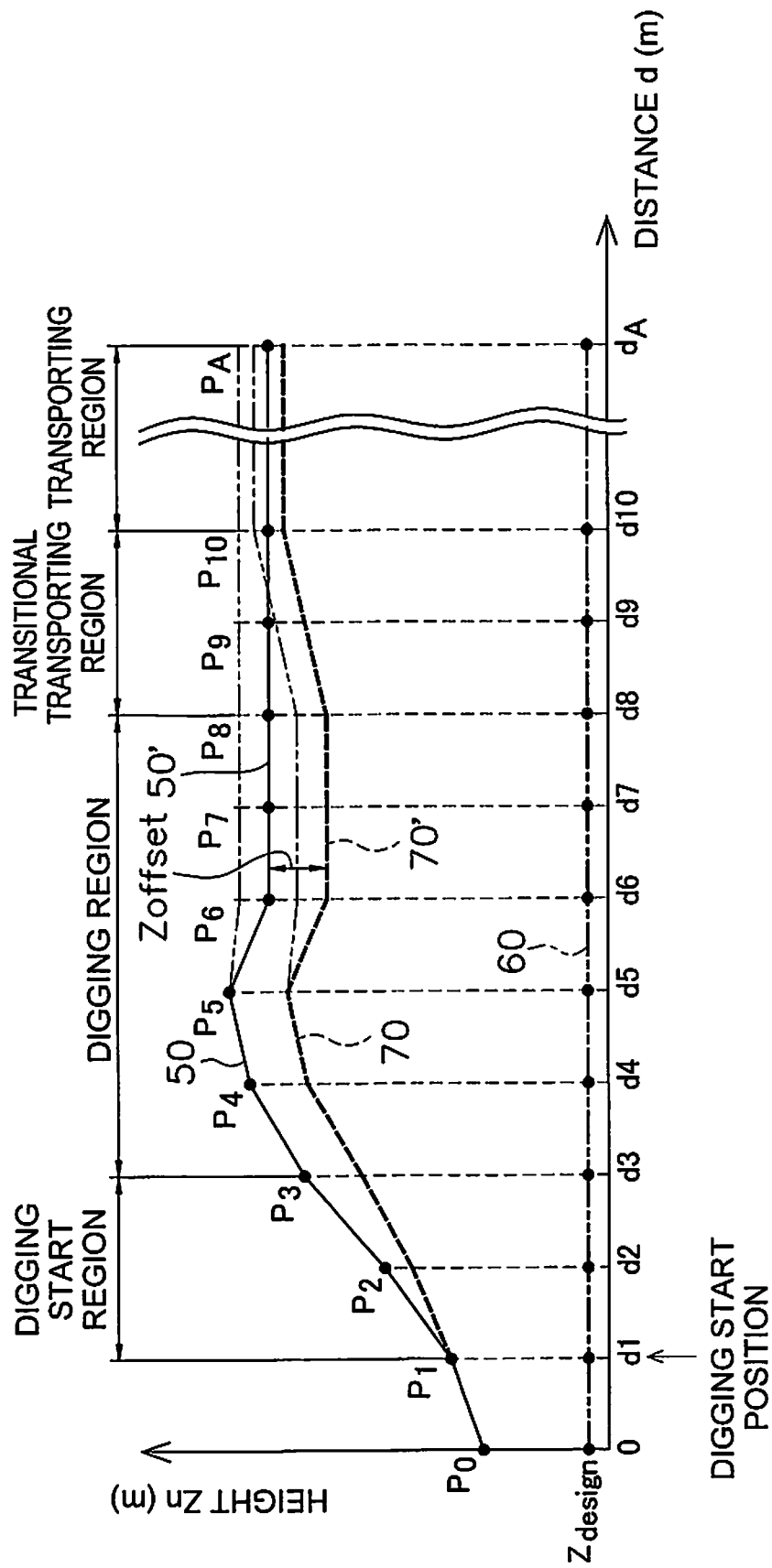
FIG. 9 is a graph showing an example of an updated final design terrain, current terrain, and target design terrain.

For example, as shown in FIG. 9, let us assume that the travel direction of the work vehicle 1 is changed at the reference point P6. In this case, in step S103 the controller 26 updates the design terrain data on the basis of the changed travel direction. In step S104 the controller 26 updates the current terrain data on the basis of the changed travel direction.

The controller 26 decides a new reference point Pn along the updated travel direction. The controller 26 calculates the height Zn of the current terrain 50 at the new reference point Pn from the height of the area Am surrounding the new reference point Pn. Consequently, as shown in FIG. 9, the controller 26 decides an updated current terrain 50' on the basis of the updated travel direction, and acquires current terrain data indicating the updated current terrain 50'. Even though the travel direction is changed, in step S105 the digging start position is maintained at the initial position. The amount of movement of the vehicle is also maintained in S106.

In step S107 the controller 26 updates the target design terrain data on the basis of the updated current terrain data. Here, as shown in FIG. 9, the controller 26 decides a target design terrain 70' in which the updated current terrain 50' has been displaced vertically by the target displacement Z_offset. Consequently, the target design terrain is changed from the target design terrain 70 before the change in travel direction (hereinafter referred to as the first target design terrain 70) to the target design terrain 70' after the change in travel direction (hereinafter referred to as the second target design terrain 70'). The processing in steps S108 and S109 is the same as the processing discussed above, and will therefore not be described in detail.

The travel direction of the work vehicle 1 may be the actual travel direction of the work vehicle 1 obtained from the vehicle position data of the GNSS receiver 32, that is, it may be the actual orientation of the work vehicle 1. Alternatively, the travel direction of the work vehicle 1 may be the target orientation of the work vehicle 1 set by the controller 26. The controller 26 may control the work vehicle 1 so as to maintain the travel direction of the work vehicle 1 at the target orientation.

With the control system 3 of the work vehicle 1 according to this embodiment and described above, the controller 26 decides the target displacement Z_offset according to the amount of movement n by referring to target displacement data. The controller 26 then decides a target design terrain 70 that is displaced vertically by the target displacement Z_offset from the current terrain 50. Thus controlling the blade 18 toward the target design terrain 70 allows the work to be carried out more smoothly, without producing large bumps or valleys.

In digging work, when the amount of movement n of the work vehicle 1 is small, the held soil volume of the blade 18 is also small. Therefore, digging work can be performed more efficiently by setting a large target displacement Z_offset in the digging region where the amount of movement n is small.

When the amount of movement n of the work vehicle 1 is large, the held soil volume of the blade 18 is also large. Therefore, the held soil volume can be prevented from becoming too large by setting a small target displacement Z_offset in the transporting region where the amount of movement of the work vehicle 1 is large. This prevents an excessive load from being exerted on the blade 18. Or, the amount of soil that leaks from the blade 18 can be kept low.

The controller 26 decides the first end value b2 to be the amount of movement n of the work vehicle 1 at the point when the current held soil volume goes over a specific threshold. This more accurately prevents the held soil volume from becoming excessive.

The controller 26 updates the travel direction of the work vehicle 1, and updates the target design terrain 70 on the basis of the updated travel direction. Therefore, when the travel direction of the work vehicle 1 is changed in the middle of the travel path of the work vehicle 1 from the travel direction at the starting point of that travel path, the target design terrain is changed from the first target design terrain 70 at the outset to the second target design terrain 70'. Accordingly, even if the travel direction should be changed in the middle of the travel path of the work vehicle 1 due to an obstacle, an unbalanced load on the work implement 13, or some other such factor while the work vehicle 1 is traveling, the work can still be continued efficiently.

The starting point of the travel path is the above-mentioned digging start position, but may instead be some other position. For example, the starting point of the travel path may be a point that is specified as desired by the operator. Alternatively, the starting point of the travel path may be a point that is automatically determined by the controller.

An embodiment of the present invention was described above, but the present invention is not limited to or by the above embodiment, and various modifications are possible without departing from the gist of the invention.

The work vehicle 1 is not limited to a bulldozer, and may be some other vehicle such as a wheel loader or a motor grader.

The work vehicle 1 may also be a vehicle that can be steered remotely. In that case, part of the control system 3 may be located outside of the work vehicle 1. For example, the controller 26 may be located outside of the work vehicle 1. The controller 26 may be disposed in a control center that is away from the work site.

Figure 10:
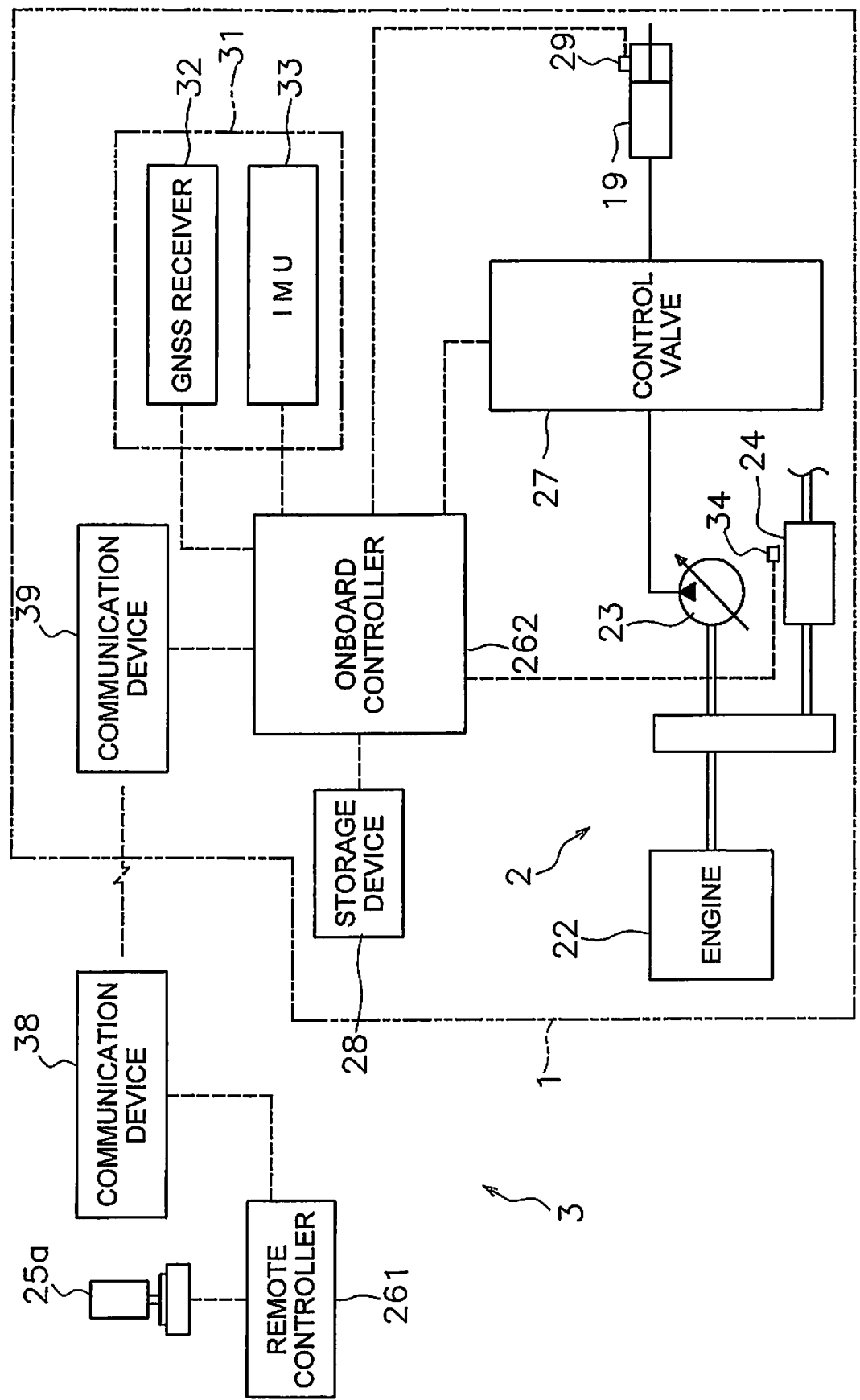
FIG. 10 is a block diagram of the configuration of a control system pertaining to a first modification example.

The controller 26 may have a plurality of controllers separate from one another. For example, as shown in FIG. 10, the controller 26 may include a remote controller 261 disposed outside of the work vehicle 1 and an onboard controller 262 installed in the work vehicle 1. The remote controller 261 and the onboard controller 262 may be capable of communicating wirelessly via communication devices 38 and 39. Some of the functions of the controller 26 discussed above may be executed by the remote controller 261, and the rest by the onboard controller 262. For example, processing for deciding the target design terrain 70 may be executed by the remote controller 261, and processing for outputting a command signal to the work implement 13 may be performed by the onboard controller 262.

The operating device 25a may be disposed outside of the work vehicle 1. In that case, the cab may be omitted from the work vehicle 1. Alternatively, the operating device 25a may be omitted from the work vehicle 1. The work vehicle 1 may be operated by automatic control under the controller 26 alone, without any input from the operating device 25a.

Figure 11:
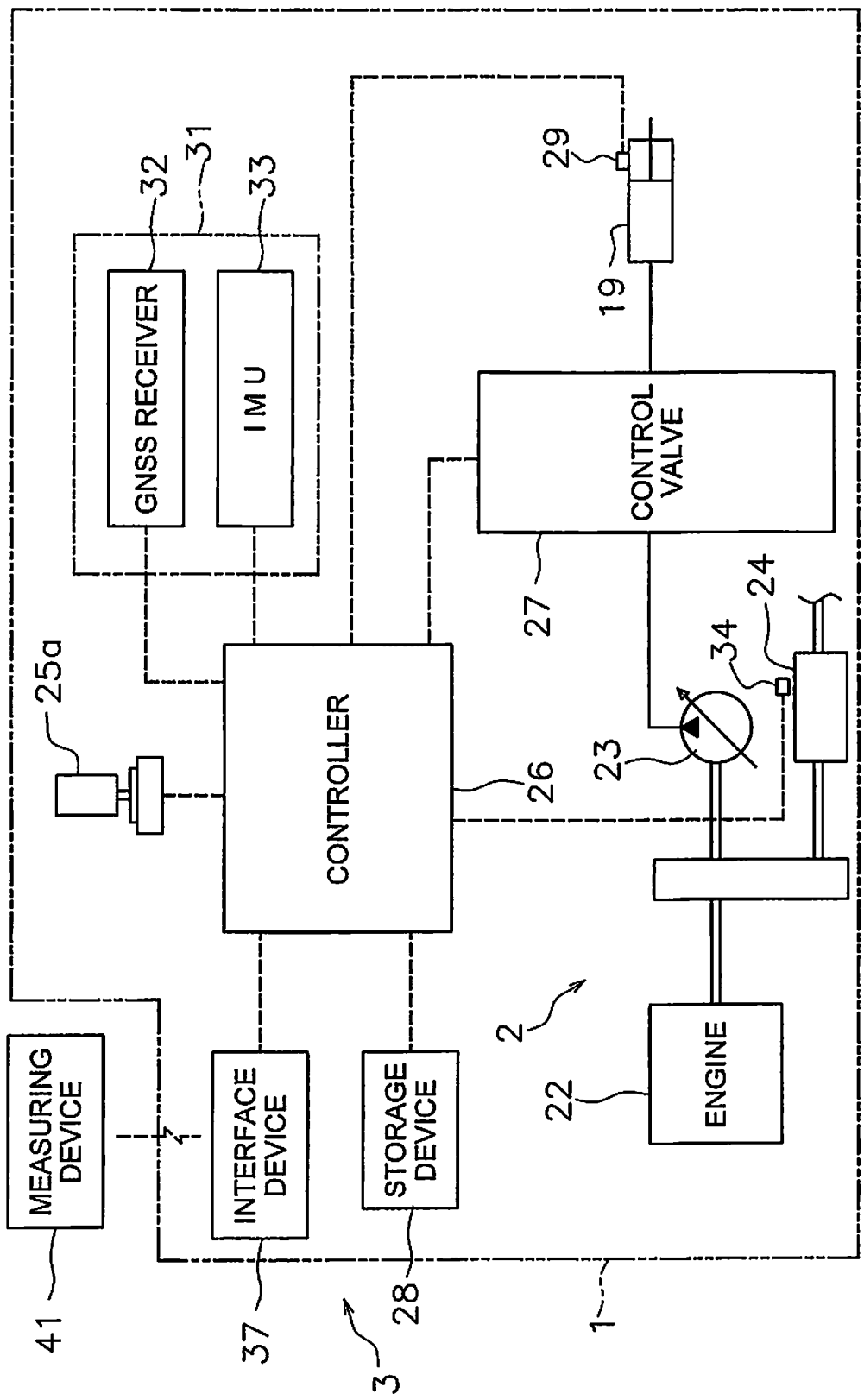
FIG. 11 is a block diagram of the configuration of a control system pertaining to a second modification example.

The current terrain 50 may be acquired from some other device besides the above-mentioned position detecting device 31. For example, as shown in FIG. 11, the current terrain 50 may be acquired by an interface device 37 that receives data from an external device. The interface device 37 may wirelessly receive current terrain data measured by an external measuring device 41. Alternatively, the interface device 37 may be a recording medium reader and may receive current terrain data measured by the external measuring device 41 via a recording medium.

The controller 26 may decide the target design terrain 70 on the basis of the current terrain 50 that has been smoothed. That is, the controller 26 may decide the target design terrain 70 that has been displaced by the target displacement Z_offset from the smoothed current terrain 50. Smoothing means processing to smooth out the height changes in the current terrain 50. For example, the controller 26 may smooth the height Zn at a plurality of points in the current terrain 50 according to the following formula (2).

$$Z_{n\_sm} = (\Sigma_{k=n-2}^{n+2} Z_k)/5 \qquad \text{Formula 2}$$

Zn_sm indicates the height of each point in the smoothed current terrain 50. In Formula 2 smoothing is performed using the average value for height at five points. However, the number of points used in the smoothing may be less than five or greater than five. The number of points used for smoothing can be varied, and the operator can set the desired degree of smoothing by changing the number of points used for smoothing. Also, what is calculated is not limited to the average value of the height of a point to be smoothed and points ahead and behind, and may also be the average value of the height of a point to be smoothed and points ahead. Alternatively, the average value of the height of a point to be smoothed and points behind may be calculated. Or, some other smoothing processing may be used, and not just the average value.

The target displacement data may be data indicating the relation between a target load parameter and the amount of movement. Alternatively, the controller 26 may decide the target design terrain by referring to target load parameter data indicating the relation between a target load parameter and the current position of the work vehicle 1. As long as it is a parameter related to the load on the work implement 13, the target load parameter is not limited to target displacement as in the above embodiment.

Figure 12:
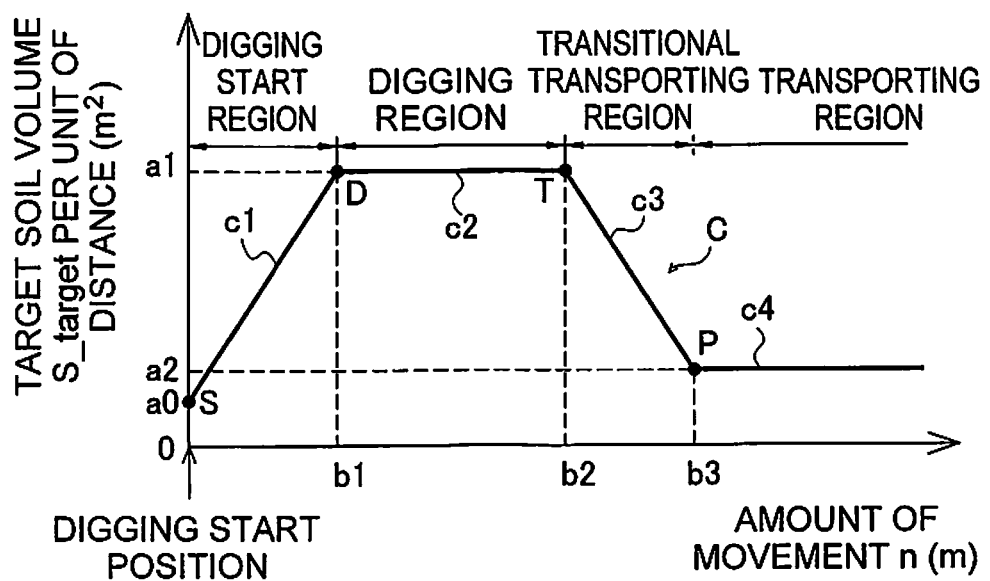
FIG. 12 is a graph showing an example of target load parameter data.

For example, FIG. 12 is a diagram showing another example of target load parameter data. As shown in FIG. 12, the target load parameter may be the target soil volume S_target for each point in a flat terrain. Specifically, the target load parameter may be the target soil volume S_target per unit of distance. For example, the controller 26 can calculate the target displacement Z_offset from the target soil volume S_target and the width of the blade 13.

Alternatively, the target load parameter may be a parameter that is different from the target soil volume S_target per unit of distance. For example, the target load parameter may be a parameter indicating the target value of the load on the work implement 13 at each point. The controller 26 can calculate the target displacement Z_offset at each point from the target load parameter. In that case, the controller 26 may increase the target displacement Z_offset according to the increase in the target load parameter.

Figure 13:
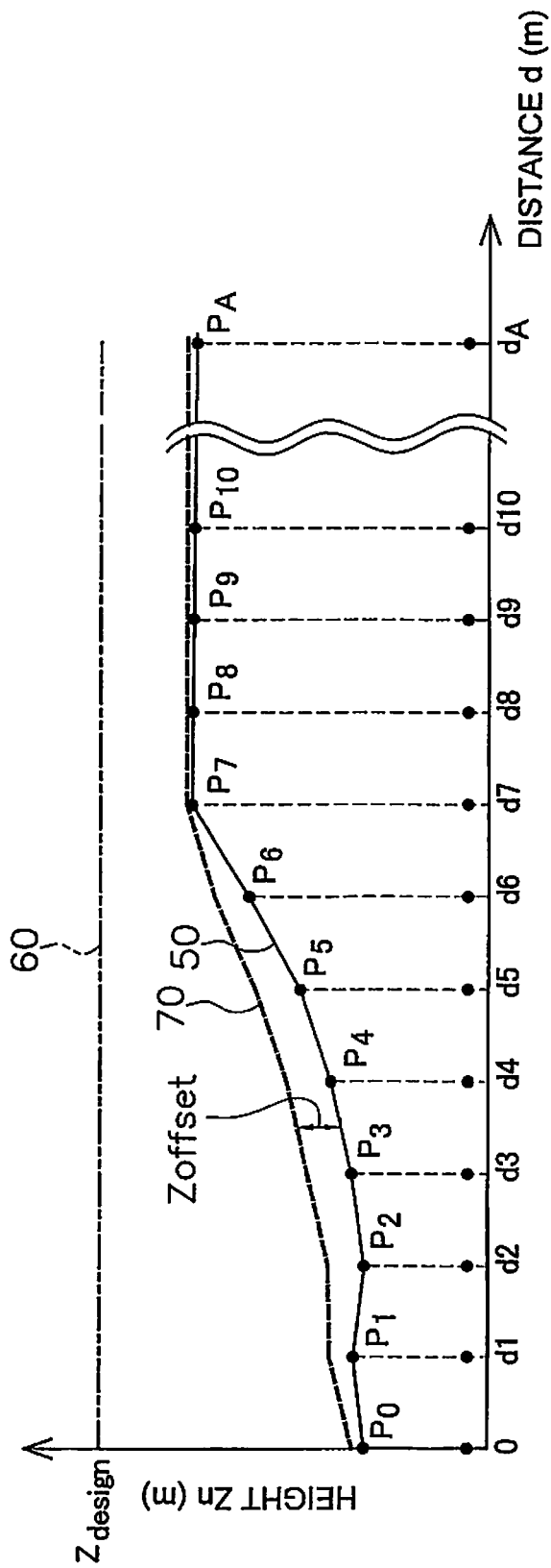
FIG. 13 is a graph showing another example of a target design terrain.
Figure 14:
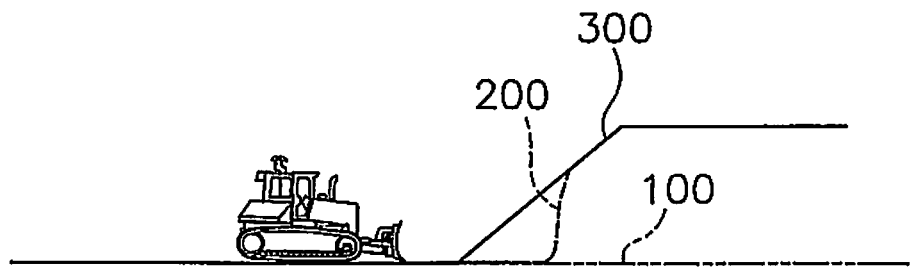
FIG. 14 is a diagram of digging work according to prior art.

As shown in FIG. 13, the controller 26 may decide a target design terrain 70 that is displaced upward by the target displacement Z_offset from the current terrain 50. In this case, it is possible to perform embankment work instead of digging work.

The target displacement Z_offset may be multiplied by a specific coefficient. Alternatively, a specific constant may be added to or subtracted from the target displacement Z_offset. The specific coefficient and the specific constant may be changed according to the change in the control mode.

INDUSTRIAL APPLICABILITY

With the present invention, a work vehicle can be made to perform work efficiently and with good finish quality under automatic control.

The invention claimed is:

1. A control system for a work vehicle including a blade, the control system comprising:
    a controller programmed to
        set a target orientation for the work vehicle,
        acquire the target orientation as a travel direction of the work vehicle,
        acquire current terrain data indicating a current terrain existing in the travel direction of the work vehicle,
        calculate a height of the current terrain at a plurality of reference points located in the travel direction of the work vehicle,
        acquire the height of the current terrain at the plurality of reference points as the current terrain data,
        decide on a target surface profile of a work site based on the current terrain data,
        generate a command signal to operate the blade according to the target surface profile,
        update the travel direction of the work vehicle, and
        update the target surface profile based on the updated travel direction.

2. The control system for a work vehicle according to claim 1, wherein
    the controller is further programmed to
        update the current terrain data based on the updated travel direction, and
        update the target surface profile based on the updated current terrain data.

3. The control system for a work vehicle according to claim 1, wherein
    the controller is further programmed to
        sense an actual orientation of the work vehicle, and
        acquire the actual orientation as the travel direction of the work vehicle.

4. The control system for a work vehicle according to claim 1, further comprising:
    a storage device that stores work site terrain data in which the current terrain is divided into a plurality of areas in a grid in a horizontal plane, the work site terrain data indicating a height of each of the areas;
    the controller being further programmed to
        calculate the height of the current terrain at the plurality of reference points located in the travel direction of the work vehicle from the height of the area including each reference point.

5. The control system for a work vehicle according to claim 1, wherein
    the controller is further programmed to
        decide a target design terrain in which the current terrain is displaced vertically, and
        set the target design terrain as the target surface profile.

6. The control system for a work vehicle according to claim 1, wherein
    the controller is further programmed to
        acquire the travel direction of the work vehicle at a starting point of a travel path of the work vehicle,
        decide a first target surface profile based on the travel direction at the starting point, and
        decide a second target surface profile based on the updated travel direction when the travel direction is updated in a middle of the travel path.

7. A method executed by a processor for setting a trajectory of a blade of a work vehicle, the method comprising:
    setting a target orientation of the work vehicle, the target orientation being acquired as a travel direction of the work vehicle,
    acquiring current terrain data indicating a current terrain existing in the travel direction of the work vehicle;
    calculating a height of the current terrain at a plurality of reference points located in the travel direction of the work vehicle, the height of the current terrain at the plurality of reference points being acquired as the current terrain data,
deciding a target surface profile of a work site based on the current terrain data,
updating the travel direction of the work vehicle; and
updating the target surface profile based on the updated travel direction.

8. The method for setting the trajectory of a blade according to claim 7, further comprising
updating the current terrain data based on the updated travel direction, the target surface profile being updated based on the updated current terrain data.

9. The method for setting the trajectory of a blade according to claim 7, further comprising sensing an actual orientation of the work vehicle, the actual orientation being acquired as the travel direction of the work vehicle.

10. The method for setting the trajectory of a blade according to claim 7, further comprising
referring to work site terrain data in which the current terrain is divided into a plurality of areas in a grid in a horizontal plane, the work site terrain data indicating a height of each of the areas; and
calculating the height of the current terrain at the plurality of reference points located in the travel direction of the work vehicle from the height of the area including each reference point.

11. The method for setting the trajectory of a blade according to claim 7, further comprising deciding a target design terrain in which the current terrain is displaced vertically, the target design terrain being set as the target surface profile.

12. The method for setting the trajectory of a blade according to claim 7, wherein
the travel direction of the work vehicle is acquired at a starting point of a travel path of the work vehicle,
a first target surface profile is decided based on the travel direction at the starting point, and
a second target surface profile is decided based on the updated travel direction when the travel direction is updated in a middle of the travel path.

13. A work vehicle comprising:
a blade; and
a controller programmed to
set a target orientation for the work vehicle,
acquire the target orientation as the travel direction of the work vehicle,
acquire current terrain data indicating a current terrain existing in the travel direction of the work vehicle,
calculate a height of the current terrain at a plurality of reference points located in the travel direction of the work vehicle,
acquire the height of the current terrain at the plurality of reference points as the current terrain data,
decide on a target surface profile of the work site based on the current terrain data,
generate a command signal to operate the blade according to the target surface profile,
update the travel direction of the work vehicle, and
update the target surface profile based on the updated travel direction.

14. The work vehicle according to claim 13, wherein the controller is further programmed to
update the current terrain data based on the updated travel direction, and
update the target surface profile based on the updated current terrain data.

15. The work vehicle according to claim 13, wherein the controller is further programmed to
sense an actual orientation of the work vehicle, and
acquire the actual orientation as the travel direction of the work vehicle.

16. The work vehicle according to claim 13, wherein the controller is further programmed to
refer to work site terrain data in which a current terrain is divided into a plurality of areas in a grid in a horizontal plane, the work site terrain data indicating a height of each of the areas,
calculate the height of the current terrain at the plurality of reference points located in the travel direction of the work vehicle from the height of the area including each reference point.

17. The work vehicle according to claim 13, wherein the controller is further programmed to
decide a target design terrain in which the current terrain is displaced vertically, and
set the target design terrain as the target surface profile.

18. The work vehicle according to claim 13, wherein the controller is further programmed to
acquire the travel direction of the work vehicle at a starting point of a travel path of the work vehicle,
decide a first target surface profile based on the travel direction at the starting point, and
decide a second target surface profile based on the updated travel direction when the travel direction is updated in a middle of the travel path.

* * * * *